United States Patent
Macovski

[11] 3,735,036
[45] May 22, 1973

[54] REAL TIME INTERFEROMETRY CONTOUR MAPPING SYSTEM

[75] Inventor: Albert Macovski, Palo Alto, Calif.

[73] Assignee: American Express Investment Management Company, San Francisco, Calif.

[22] Filed: Oct. 26, 1970

[21] Appl. No.: 84,031

[52] U.S. Cl. .....................178/6.8, 350/3.5, 356/109
[51] Int. Cl. .................................................H04n 5/30
[58] Field of Search .........................178/6.8; 350/3.5; 356/2, 71, 109

[56] References Cited

UNITED STATES PATENTS

| | | | |
|---|---|---|---|
| 3,573,362 | 4/1971 | Burchardt | 350/3.5 |
| 3,541,252 | 11/1970 | Collier | 350/3.5 |
| 3,552,858 | 1/1971 | Haines | 350/3.5 |
| 3,592,548 | 7/1971 | Majkowski | 356/109 |

*Primary Examiner*—Robert L. Griffin
*Assistant Examiner*—Joseph A. Orsino, Jr.
*Attorney*—Townsend and Townsend

[57] ABSTRACT

A real time holographic interferometer for measuring height variations or contours on the surface of an object is disclosed. Two interference patterns are formed, one of an object whose surface is to be mapped and one of a reference plane or other standard surface using holographic techniques. The interference patterns form visual inputs to a television camera which converts them into electrical signals. These electrical signals are combined to produce an output which contains information relative to the height variations or altitude contours of the object and the height contour information is displayed on an appropriate display device.

43 Claims, 7 Drawing Figures

FIG_1

FIG_3

FIG_4

FIG_5

FIG_6

FIG_7

INVENTOR.
ALBERT MACOVSKI

REAL TIME INTERFEROMETRY CONTOUR MAPPING SYSTEM

This application is related to and uses some of the techniques described in "Scanned Holography Systems Using Temporal Modulation," Ser. No. 781,842, filed Dec. 6, 1968, and is a continuation-in-part of application Ser. No. 30,074 filed on Apr. 20, 1970, entitled "Real Time Interferometry" now U.S. Pat. No. 3,649,754 issued Mar. 14, 1972.

This invention relates to hologram interferometry and more particularly to real time hologram interferometry for measuring small dimension surface contours of an object and for comparing an object surface with a standard reference surface.

A holographic system is one wherein light diffracted by an object or reflected by an object is presented with a reference wave to produce a complex light interference pattern that contains information about both the amplitude and phase of the light diffracted or reflected from the object. The interference pattern may be recorded for example on photographic film which may respond only to intensity and the recorded interference pattern is called a hologram. By directing light having a frequency content substantially corresponding to that of the light diffracted or reflected by the original object through the recorded interference pattern, an image of the original object can be obtained.

The earliest means of recording and reconstructing holograms were called on-axis systems and had the advantage that the photographic film used to record the information about the amplitude and phase of the diffracted waves could be a low resolution film. However, this early system had the disadvantage that it was extremely difficult to separate the desired image from interfering light and other images in the reconstructed wave.

In an effort to separate meaningful images from background noise in a holographic system an off-axis system was developed. In this system the recording plane received light from the object and the reference waves from different locations. The frequency of the interference fringes which must be recorded on the hologram is increased as a function of the angle between the interfering waves. Thus, it is necessary to utilize a recording medium (photographic film, for example) which has a much higher resolution than is necessary to make the same recording using an on-axis holographic system.

This type of holography has been applied in hologram interferometry for measuring small dimensional changes in an object. For example, this is done in searching for defects in automobile tires. A first hologram is made of the object, such as the tire. The object is then altered or stressed in some specific way; for example, the tire pressure is increased. A second is then made of the object in the stressed condition, and the first and second holograms are superimposed. The interference fringes in the final reconstruction of the developed hologram transparency indicate the amount of movement which has taken place in each area. In the case of the tire, excessive fringes in a local area is indicative of a defect. This method of hologram interferometry, however, requires the awkward wet processing of photographic film. In addition, very high resolution emulsions are required since, as in conventional holography, the reference is introduced at an angle in order to eliminate undesired components.

In U.S. Patent application Ser. No. 30,074 referred to above, these disadvantages are overcome in a novel real time interferometry system which enables real time display of possible defects in an object under stress. It would also be desirable however to apply similar real time interferometry to enable improved mapping and display of height variations and contours of small dimensions on the surface of an object or to compare the surface of an object with a standard reference surface for quality control.

It is therefore an object of this invention to measure small dimensional surface height variations or contours of an object by real time hologram interferometry. Briefly, in accordance with one embodiment of the invention, real time interferometry is achieved by imaging two interference patterns one of the object and one of a reference plane or standard surface, on a television camera. The output of the television camera for the two interference patterns are combined to produce a display of height variations in the object surface in the direction along the optical axis. Since an image hologram is used instead of a Fresnel or Fourier transform hologram, no transparency is required in order to perform a read-out.

The novel features which are believed characteristic of the invention are set forth with particularity in the appended claims. The invention as to its organization and method of operation, together with further objects and advantages, however, may best be understood by reference to the following description and accompanying drawings:

Figure 1:
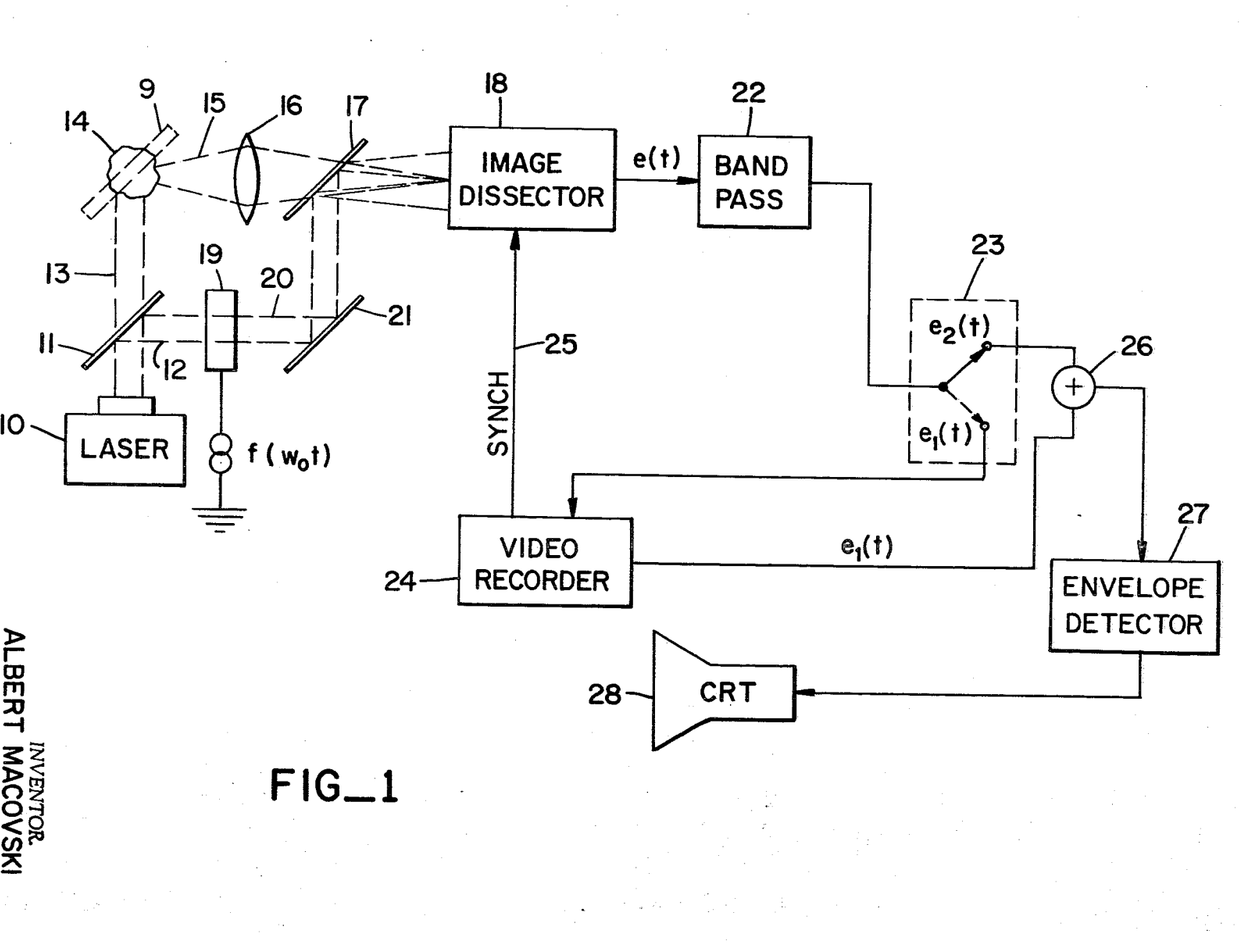
FIG. 1 schematically illustrates one embodiment of a hologram real time interferometer according to the present invention which uses the basic principles of temporal offset holography.

Referring now to FIG. 1, there is shown one embodiment of the present invention which utilizes the basic principles of temporal offset holography as described in "Scanned Holography Systems Using Temporal Modulation," Ser. No. 781,842, referred to above. In FIG. 1 light from a continuous laser 10 is split by a half-silvered mirror 11 into an object beam 13 and a reference beam 12. The object beam 13 illuminates an object 14 which is being inspected and the object 14 scatters and reflects the object beam 13 to form a scattered object beam 15. The scattered object beam 15 is focused by a lens 16 through a half-silvered mirror 17 onto the face of an image dissector 18.

In order to provide a cyclical temporal offset between the reference and object waves 12 and 13, a light frequency shifter 19 is inserted in the path of the reference beam 12. In this case the frequency shifter 19 constitutes a single sideband modulator which shifts the frequency of reference beam 12 by an amount $w_o$. The modulated reference beam 20 is recombined with light from the scattered and reflected object beam 15 by an arrangement of mirrors. That is, a mirror 21 is positioned in the path of the modulated reference beam 20 at an angle of 45° relative to its axis (parallel to the plane of beam splitter 11) thus reflecting the modulated reference beam 20 at an angle of 90° (upward in the drawing) to the beam splitter 17 placed at a 45° angle to the path of the modulated reference beam 20 (parallel to both beam splitter 11 and mirror 21) in such a manner that it combines the modulated reference beam 20 and the scattered and reflected object beam 15. In this embodiment, the final mirror for combining the two beams is a beam splitter, because the modulated reference beam 20 must be brought to the face of the image dissector 18 on-axis with the center of the scattered and reflected object beam 15 in order to form the desired interference pattern. The on-axis arrangement effectively minimizes spatial frequencies at the interference plane or face of the image dissector 18.

The interference between the scattered and reflected object beam 15 and the modulated reference beam 20 ($e^{jw_o t}$) are applied to the image dissector 18 which measures the instantaneous intensity while scanning. In order to provide contour mapping of the surface height variations of the object in the direction of the optical axis of the lens 16, a standard reference plane such as a flat white surface 9 (shown in dotted line) is first used. The standard flat surface 9 is illuminated by object beam 13 to form the deflected object beam 15.

The intensity of the light scattered from the standard reference plane is given by $$U = e^{j\theta_1(x,y)}$$

and the intensity of the reference wave may be expressed as $$R = e^{jw_o t}$$

The unvarying amplitude is taken to be unity. Thus the sum of the two beams in the interference pattern at the face of the image dissector 18 is given by $$I_1 = |U + e^{jw_o t}|^2$$
$$= 2 + 2 \cos[\theta_1 - w_o t]$$

The output $e(t)$ of the image dissector 18 is proportional to the intensity $I_1$. The output $e(t)$ is filtered by a bandpass filter 22 so that the output of the bandpass filter 22 contains only the time varying signal with an amplitude of 1.

$$e_1(t) = \cos[\theta_1 - w_o t]$$

The signal $e_1(t)$ is applied through a switch 23 which at this time is in a position shown by the dotted lines to a video recorder 24 where it is recorded.

In a second exposure, the object 14 is used. A second image is produced on the image dissector 18 having an associated intensity $I_2$. The synchronization between the stored image resulting from the first exposure or scan which is stored on the video recorder and the second exposure or scan must be carefully maintained. One method of insuring such synchronism is, on the second scan, to derive the camera synchronizing signals from the sync signal recorded on the video recorder during the first scan. This is illustrated in FIG. 1 by a connection 25 between the video recorder 24 and the image dissector 18. Alternatively, a sync signal may be recorded on a separate track of the video recorder 24 and this sync signal used for both the first and second scans. With either approach synchronization is maintained between the first and second scan and for the second scan the output of bandpass filter 22 is given by $$e_2(t) = a \cos[\theta_2 - w_o t]$$

The switch 23 is placed in the position shown by the solid line in FIG. 1 during the second scan and the signal $e_2(t)$ is applied to a summer 26. Simultaneously, the signal $e_1(t)$ which was recorded on video recorder 24 during the first scan is also applied to the summer 26 during the time of the second scan so that $e_1(t)$ and $e_2(t)$ are added together by the summer 26. The output of the summer 26 is envelope detected by an envelope detector 27.

The significant change takes place in the phase where $\Delta \theta = k \Delta z$, where $\Delta z$ is the difference in the z position of the object and reference plane and $k$ is the wave number $2\pi/\lambda$. The resultant envelope of the sum is given by $$\text{Envelope}\,[e_1(t) + e_2(t)] = \sqrt{\tfrac{1}{2}(1 + a^2) + a \cos(\theta_1 - \theta_2)}$$

This signal is displayed on a cathode ray tube 28 showing the original image $a(x,y)$ modulated by an interference signal due to the difference in axial position z between the surface of the plane and of the object 14. Note that no spatial frequencies higher than that of the image ever have to be handled by the image dissector 18 or the output cathode ray tube 28. This system can be used for assembly line testing of a wide variety of products.

An alternate means of detection, rather than taking the envelope of the sum, is to take the product of the two signals $e_1(t)$ and $e_2(t)$ where $e_1(t) \times e_2(t) = a \cos(\theta_1 - \theta_2)$. In this case, the product device or multiplier is followed by a low pass filter.

One of the difficulties of the system just described in connection with FIG. 1 is that the video recorder is required to store and reproduce the offset carrier frequency $w_o$, with good phase accuracy. This not only requires increased frequency response of the video recorder, but also might necessitate minimizing the wow and flutter beyond that normally required. This requirement can be eliminated by an arrangement such as that shown in FIG. 2 in which the real and imaginary parts of the signal are stored on two separate tracks of a video recorder rather than storing the carrier signal itself.

Figure 2:
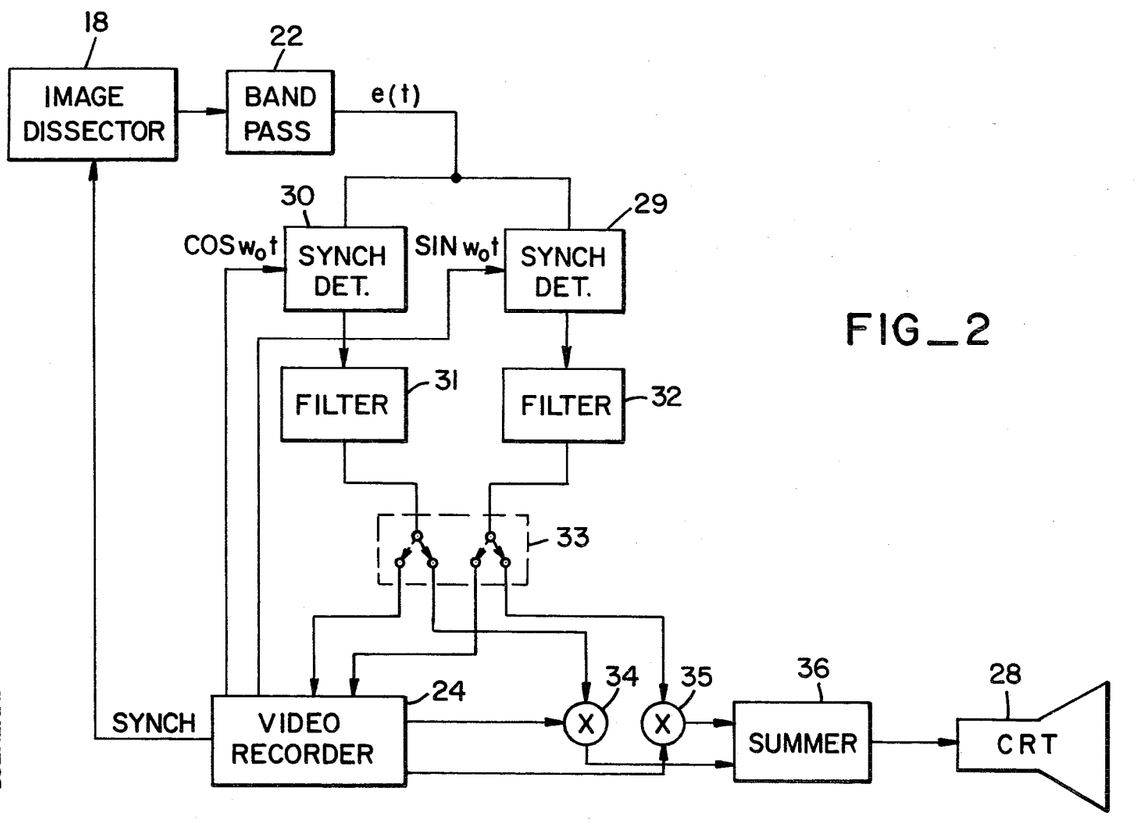
FIG. 2 is similar to FIG. 1 but shows an interferometer in which the real and imaginary parts of a signal are separately processed.

Referring now to FIG. 2, only the electronics for this system is illustrated with like reference numerals applied to elements common with the arrangement of FIG. 1. The optics arrangement for producing an interference pattern on the image dissector 18 is the same as that shown for FIG. 1 and is not shown in FIG. 2. In FIG. 2 an image dissector 18 and a bandpass filter 22 operate in the same manner as described in connection with FIG. 1 to produce a signal $e_1(t)$ during a first scan of the reference plane and a signal $e_2(t)$ during a second scan of the object. During the first scan the signal $e_1(t) = a_1 \cos[\theta_1 - w_o t]$ from the bandpass filter 22 is applied to synchronous detectors 29 and 30. As in the previous example the amplitude is 1 here indicated by $a_1$. Synchronous detector 29 multiplies $e_1(t)$ with sin $w_o t$ and synchronous detector 30 multiplies $e_1(t)$ with cos $w_o t$. The signals sin $w_o t$ and cos $w_o t$ may be obtained in any convenient manner and are shown in FIG. 2 as being obtained from pre-recorded tracks on video recorder 24. The output of synchronous detector 30 is given by $$(\cos w_o t)(a_1 \cos[\theta_1 - w_o t])$$
$$= a_1(\cos \theta_1 \cos^2 w_o t + \sin \theta_1 \sin w_o t \cos w_o t)$$
$$= a_1 [\cos \theta_1 (½ + \cos 2 w_o t) + \sin \theta_1 (\sin 2 w_o t)]$$

where the amplitude $a_1$ is unity.

The signal is then filtered by a low pass filter 31, which filters the second harmonic of $w_o$. The output of low pass filter 31 is then given by ½ $a_1 \cos \theta_1$.

In a similar manner, signal $e_1(t)$ is multiplied with sin $w_o t$ in synchronous detector 20 and filtered by a low pass filter 32. The output of low pass filter 32 may be expressed as ½ $a_1 \sin \theta_1$.

The signals ½ $a_1 \cos \theta_1$ and ½ $a_1 \sin \theta_1$ are applied through a switch 33 to the video recorder 24 where they are stored.

During the second scan, during which the object under examination is scanned as discussed before in connection with FIG. 1, the same synchronous detector 29 and 30 and low pass filters 31 and 32 are used to develop $a_2 \cos \theta_2$ and $a_2 \sin \theta_2$. In the arrangement of FIG. 2, the image dissector synchronizing signals are derived in the same manner as discussed before in connection with FIG. 1; that is, either both the first and second scans are synchronized to a sync signal recorded on video recorder 24 or the second scan is synchronized to a sync signal recorded on video recorder 24 during the first scan. The only significant change takes place in the phase where $\Delta\theta = k\Delta z$, where $\Delta z$ is the change in the z position of the object and $k$ is the wave number $2\pi/\lambda$. Thus, for purposes of simplifying the mathematics involved, it can be said that $a_1 = 1$ and $a_2 = a$. The signals stored during the first scan, $\cos\theta_1$ and $\sin\theta_1$, are combined with the signals developed during the second scan, a $\cos \theta_2$ and a $\sin \theta_2$, during the time of the second scan by product devices 34 and 35, which may be any of the well known devices in the art for multiplying two signals together. The output of product device 34 is cos $\theta_1$ a cos $\theta_2$ and the output of product device 35 is sin $\theta_1$ a sin $\theta_2$. These two outputs are added together in a summer 36 to yield a signal described by $$\cos \theta_1\, a \cos \theta_2 + \sin \theta_1\, a \sin \theta_2 = a \cos (\theta_1 - \theta_2)$$

This signal can be applied directly to a cathode ray tube 28 as shown in FIG. 2 to directly indicate the height contour of the object surface relative to the standard reference surface, in this case a plane.

Figure 3:
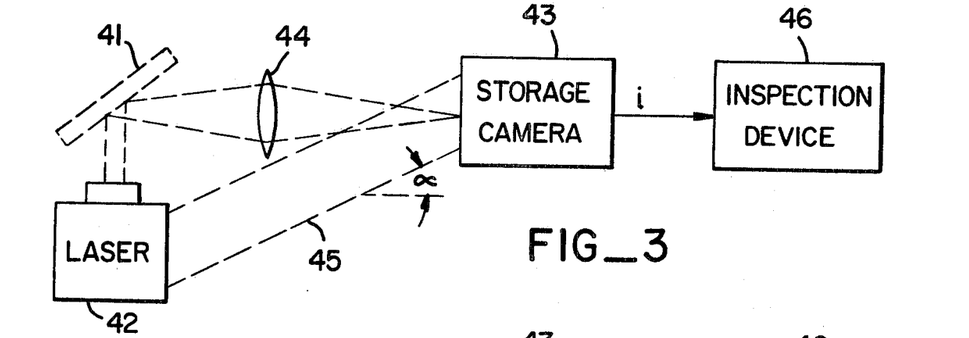
FIGS. 3a and 3b show alternate display arrangements for the interferometers of FIGS. 1 and 2.

Still another approach to real time interferometry in accordance with the principles of this invention is shown in FIG. 3. In FIG. 3 a reference plane 41 is illuminated by a laser 42 and the diffracted and reflected light from the standard surface 41 is imaged on the face of a storage camera tube 43 by a lens 44. A storage camera tube has significantly better light sensitivity than that of an image dissector camera tube.

The storage camera tube 43 may be any storage type television tube such as a vidicon or orthicon. Since these tubes cannot respond to rapidly varying intensities, spatial offset is used wherein a reference beam 45 from the laser 42 is incident on the storage camera 43 at some angle $\alpha$, with respect to the optical axis of the storage camera, where $\beta = \sin \alpha$. The intensity on the face of the storage camera 43 is given by $$I_1 = |U_1(x,y) + e^{jk\beta y}|^2$$

where $U_1(x,y)$ is the intensity of the diffracted and reflected light from object 41 which is given by $$U_1 = e^{j\theta_1(x,y)}$$

Thus $I_1 = 1 + |U_1|^2 + U_1 e^{-jk\beta y} + U_1^* e^{jk\beta y}$ where * represents conjugate. Then, since $U_1 = e^{j\theta_1(x,y)}$ $$I_1 = 2 + 2 \cos [\theta_1 - k\beta y]$$

Figure 4:
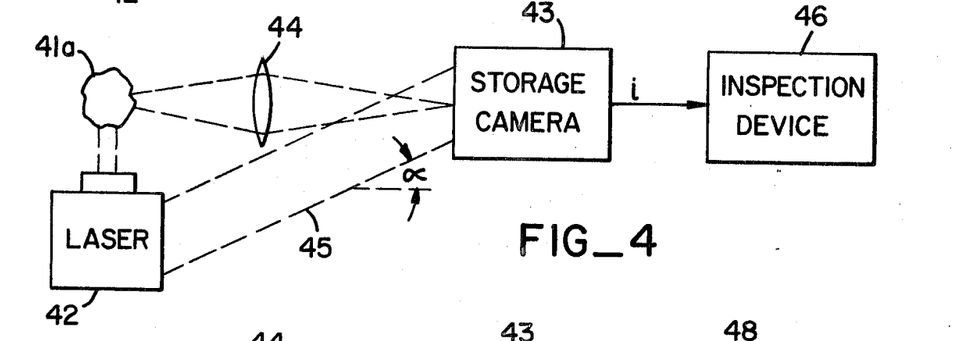
FIG. 4 shows an interferometer which utilizes a storage television camera and spatial offset of a reference beam with internal storage in the camera of two interference patterns before scanning.

As was the case in the interferometer arrangements of FIG. 1 and 2, an image is taken of the object 41a as shown in FIG. 4. Then, $$I_2 = 1 + a^2 + 2a \cos [\theta_2 - k\beta y]$$

No scanning takes place while the successive images are being applied so that the intensities $I_1$ and $I_2$ are stored in storage tube 43. Assuming that storage tube 43 is a vidicon camera and that for a vidicon camera, the output current $i$ of the camera is given by
$$i = [I_1 + I_2]^{1/2} = \{3 + a^2 + 2 \cos(\theta_1 - k\beta y) + 2a \cos(\theta_2 - k\beta y)\}^{1/2}$$

If the spatial frequency $k\beta$ is too high for the vidicon to resolve, as it will be for any reasonable value of angle $\alpha$, the camera output will only reproduce the lower frequency versions of this signal.

Thus, a relatively large spatial offset is used so as to eliminate many of the undesired patterns and maintain the relatively low spatial frequency pattern corresponding to the desired height contour information cos ($\theta_1 - \theta_2$). The storage surface of the camera tube must be capable of resolving the high spatial frequency $k\beta$ due to the offset. However, the readout beam of the camera tube, which normally limits the resolution, is not required to resolve this high spatial frequency.

Higher fringe contrast could be achieved by using more profound nonlinearities. For example, the vidicon 43 could be scanned at insufficient beam current, which effectively clips the higher intensity regions. This clipping type of nonlinearity would be a more efficient method of providing the desired mixing action. In addition, the "knee" of an image orthicon, if an image orthicon is used for storage camera 43, could be used. It is important to realize that only nonlinearities at the storage surface itself can be used. Nonlinearities applied to the electrical signal will not provide the desired effect since the high frequency signals do not exist at that point.

Figure 5:
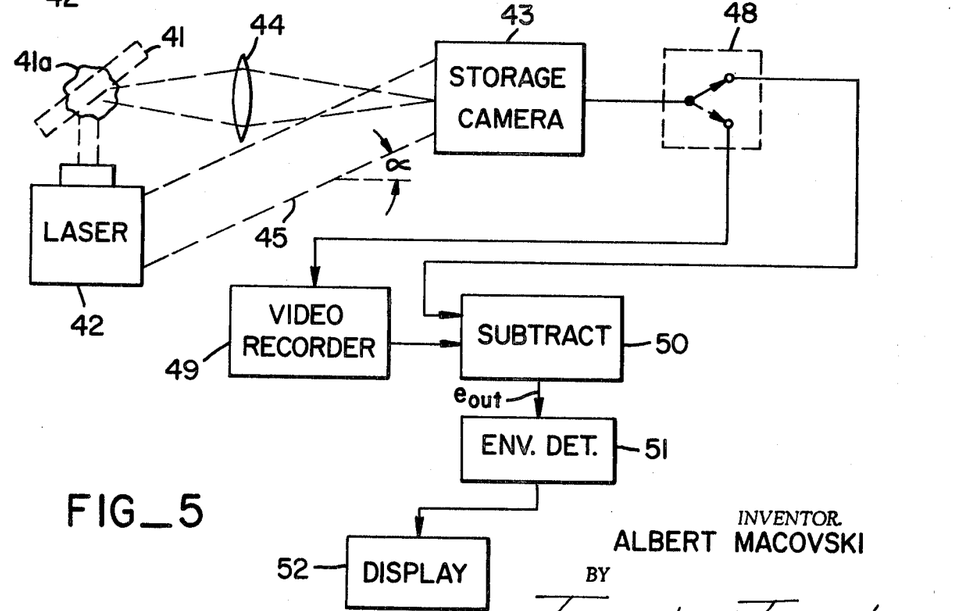
FIG. 5 is similar to FIG. 4 except that each of two interference patterns on the storage camera are scanned with storage and processing external to the camera.

An alternate approach to real time interferometry utilizing a storage camera is schematically illustrated in FIG. 5. The arrangement of FIG. 5 is similar to that of FIG. 4 and like reference numerals are applied to corresponding elements in the two figures. As before, a standard surface 41 and then an object 41a are illuminated with light from a laser 42 and the scattered and reflected light is imaged by a lens 44 on the face of a storage camera 43. A controlled phase shifter 47 is placed in the path of a reference beam 45 from laser 42, which is incident on the storage camera 43 at an angle $\alpha(\beta = \sin\alpha)$ with the optical axis of storage camera 43. In operation, the angle $\alpha$ that the reference beam makes with the optical axis of the storage camera 43 is made to be small enough that the spatial frequency $2\pi k\beta$ or $\sin \alpha/\lambda$ is within the resolution capability of the storage camera 43.

During the first scan of the reference plane 41 the resultant interference pattern on storage camera 43 is given by:

$$I_1 = 2 + 2 \cos [\theta_1 - k\beta y]$$

and is coupled through a switch 48 (which at this time is in the position shown by the dotted arrow) to a video recorder 49 where it is recorded. Next, the object 41a is used and another interference pattern is created on the face of the storage camera 43. It is desirable for this approach that the laser 42 be a pulsed laser to insure that no undesired vibration disturbs the interference pattern. The output of the storage camera 43 is given by $$I_2 = 1 + a^2 + 2a \cos [\theta_2 - k\beta$$

At this time the switch 48 is in the position shown by the solid arrow and $I_2$ and $I_1$ (previously recorded on video recorder 49) are combined in a subtracter 50. The subtracter 50 subtracts $I_2$ from $I_1$ to give a signal $e_{out}$ which is expressed as $$e_{out} \cong 2 [\cos (\theta_1 - k y) + \cos (\theta_2 - k\beta y)]$$

for the case of a uniformly illuminated object where $a \cong 1$. The signal $e_{out}$ is envelope detected by an envelope detector 51. The signal $e_{out}$ may be expressed as $e_{out} \cong 2 [\cos \theta_1 \cos k\beta y + \sin \theta_1 \sin k\beta y + \cos \theta_2 \cos k\beta y + \sin \theta_2 \sin k\beta y]$ Then the envelope of $e_{out}$
Env. $e_{out} = [(\cos \theta_1 + \cos \theta_2)^2 + (\sin \theta_1 + \sin \theta_2)^2]^{1/2}$
$= [2 + 2 \cos \theta_1 \cos \theta_2 + \sin \theta_1 \sin \theta_2]^{1/2}$
$= \sqrt{2} [(1 + \cos (\theta_1 - \theta_2)]^{1/2}$
Dropping the constants gives
Env. $e_{out} = [1 + \cos (\theta_1 - \theta_2)]^{1/2}$
Alternatively the signals $I_1$ and $I_2$ can be applied to a multiplier and followed by a low pass filter to create the signal $$1 + a^2 + a \cos (\theta_1 - \theta_2)$$

This signal is applied to a display 52. The envelope of this signal $e_{out}$ is the original picture $a$ modulated by the interference pattern due to the height contours of the object surface. The display 52 may be a cathode ray tube which is viewed by an operator. Alternatively, the signal $e_{out}$ may be limited to remove the picture information and provide the interference pattern only.

In the system of FIG. 5, it is desirable to make the interference frequency, $\sin \alpha/\lambda$, at the edge of the storage camera resolution so that the video bandwidth of the envelope can be as wide as possible for maximum resolution. The envelope detector can be aided by first heterodyning the signal to a high frequency and then filtering one sideband. In this way the output frequencies of the envelope detector are much smaller than the input frequencies, thus minimizing the filtering requirements for good resolution.

The purpose of the small angular offset frequency, within the resolution capability of the storage tube, is to provide a carrier which is amplitude modulated with the amplitude of the light from the object and phase modulated with the phase of the light from the object.

This carrier then allows for subsequent envelope detection.

Figure 6:
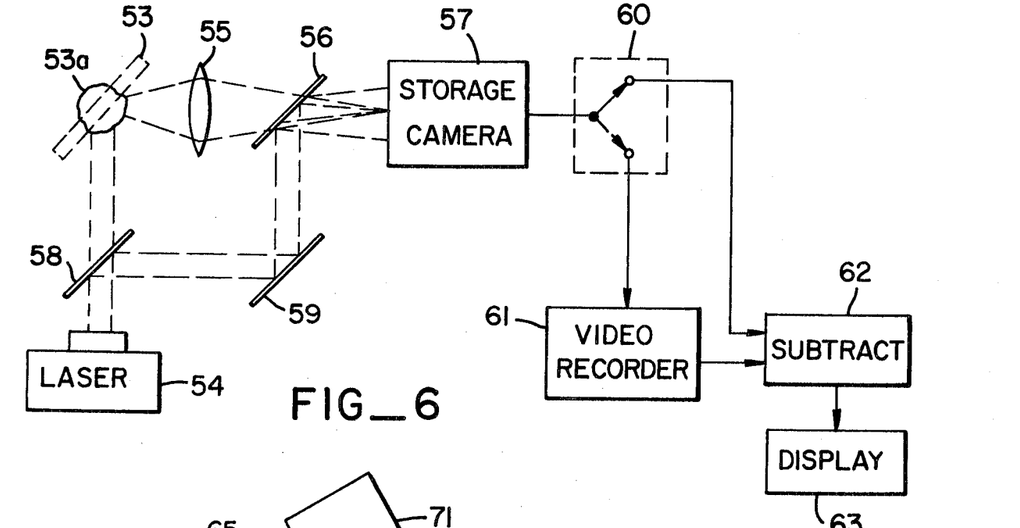
FIG. 6 shows an interferometer which requires neither temporal nor spatial offset of the reference beam but which can display only height difference information.

The arrangement of FIG. 5 produced an output showing the original picture $a$ modulated by the interference pattern due to phase variation of the object surface. It is sometimes sufficient, to simply produce an output showing only the interference pattern due to phase variation. The arrangement of FIG. 6 is adapted to produce such an output. In FIG. 6, an arrangement is shown which requires no spatial offset of the reference beam. A reference standard surface 53 and then an object 53a are illuminated with light from a laser 54. The scattered and reflected light from standard surface 53 is imaged by a lens 55 through a beam splitter (half-silvered mirror) 56 on to the face of a storage camera 57. Part of the light from laser 54 is split off by beam splitter 58 to form a reference beam, which is reflected by mirror 59 and beam splitter 56 to arrive on-axis to the storage camera 57. Since there is no spatial offset of the reference beam, the output of the storage camera 57 is given by $$I_1 = 2 + 2 \cos \theta_1$$

This signal is coupled through a switch 60 which at this time is in the position shown by the dotted arrow in FIG. 6, to a video recorder 61, where it is recorded. Next, the object 53a is scanned as discussed before, and a second output from storage camera 57 is given by $$I_2 + 1 + a^2 + 2a \cos \theta_2$$

At this time switch 60 is in the position shown by the solid arrow in FIG. 6 and $I_2$ is coupled to a subtracter 62 along with $I_1$ from video recorder 61. The subtracter 62 subtracts $I_2$ from $I_1$, to yield a signal described by $$I_1 - I_2 = 2 [\cos \theta_1 - \cos \theta_2]$$

for $a \cong 1$.

The output is applied to a display 63 which may be a cathode ray tube viewed by an operator.

In all of the approaches described, both those using image dissectors and those using storage tubes, the two signals to be compared (which have been designated $I_1$ and $I_2$ throughout) can first be applied to frequency multipliers to increase the sensitivity of the system. Thus, if the frequency of the carrier of each compared signal is multiplied by $n$, the fringe density due to the interference would be increased by $n$.

Figure 7:
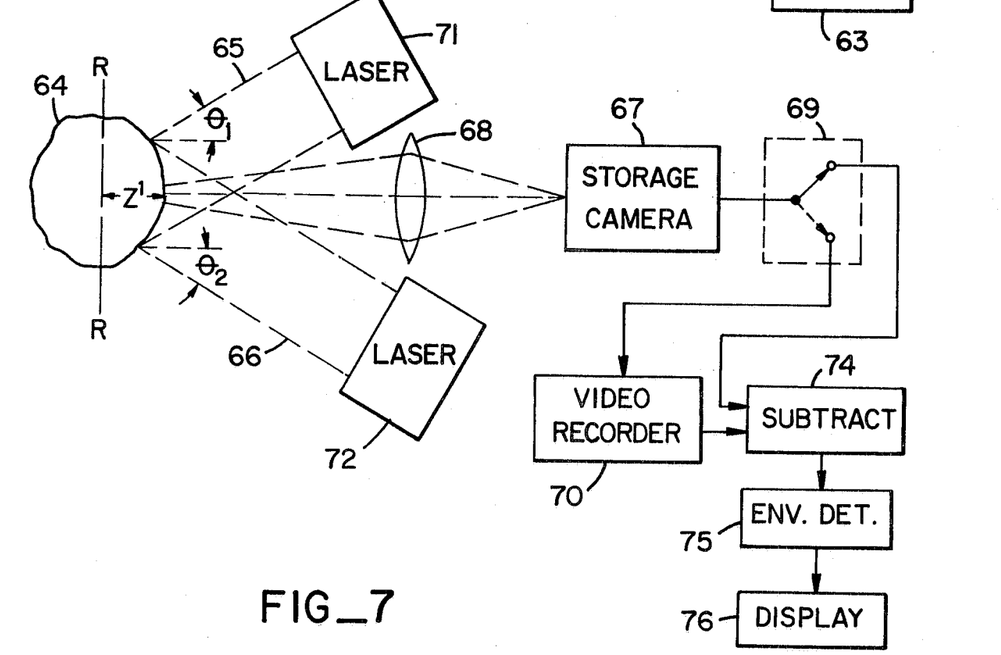
FIG. 7 shows an interferometer in which the interference pattern is produced on the object itself rather than on a television camera.

In all of the interferometry systems described thus far, the interference pattern was created at the real image by using a reference wave on the camera faceplate. In FIG. 7, there is shown a real time interferometry system in which the interference pattern is created on the object itself by illuminating it with two plane waves at different angles. The advantages of such a system are simpler geometry, increased percentage modulation of the fringe pattern, and a control over the fringe density versus displacement. Referring now to FIG. 7, a standard reference surface (not shown) and then an object 64 are illuminated by plane waves 65 and 66 incident respectively at angles $\theta_1$ and $\theta_2$ with the optical axis of a storage camera 67. In practise, to obtain a low enough spatial frequency and for the camera to resolve, both plane waves come from the same side of the optical axis. This does not change the following mathematical analysis but merely makes $\theta_2$ negative. The two plane waves 65 and 66 are described by plane wave $65 = e^{jk[\sin\theta_1 y + \cos\theta_1 z^1]}$ plane wave $66 = e^{jk[-\sin\theta_2 y + \cos\theta_2 z^1]}$ The quantity $z^1$ shown in FIG. 7 refers to the distance of the surface of object 64 from an arbitrary line RR drawn through the object 64. In other words $z^1$ represents the surface $z(x,y)$ of either the object 64, or the standard reference surface, whichever is being scanned. The amplitudes of the reflected light from the surface of a standard reference plane (not shown) as heretofore described due to the two plane waves are given by $$U_1 = e^{jk[\sin\theta_1 y + \cos\theta_1 z^1]}$$

$$U_2 = e^{jk[-\sin\theta_2 y + \cos\theta_2 z^1]}$$

The resultant intensity $I_1(x,y)$ on the standard surface is given by $$I_1(x,y) = |U_1 + U_2|^2 = 2 + 2\cos k[\alpha y + \beta z_1^1]$$

where $\alpha = (\sin\theta_1 + \sin\theta_2); \beta = (\cos\theta_1 - \cos\theta_2)$ and $z_1^1$ is the plane surface state during the first scan.

This intensity $I_1(x,y)$ is imaged by a lens 68 on the face of the storage camera 67. The output of storage camera 67 is connected through a switch 69, which at this time is in a position shown by the dotted arrow in FIG. 7, to a video recorder 70 which stores $I_1$. Next the object 64 is illuminated by plane waves 65 and 66 from lasers 71 and 72, respectively. Then the intensity on the object 64 and the output of the storage camera 67 is described by $$I_2(x,y) = |U_1 + U_2|^2 = 2a^2 + 2a^2 \cos k[\alpha y + \beta z_2^1]$$

At this time switch 69 is in the position shown by the solid arrow in FIG. 7 and $I_2$ is combined with the previously recorded $I_1$, in a subtracter 74. The subtracter 74 subtracts $I_2$ from $I_1$ to yield (for $a \cong 1$)

$$I_1 - I_2 = 2[\cos k(\alpha y + \beta z_1^1) + \cos k(\alpha y + \beta z_2^1)]$$

where $z_2$ is the surface state of the object.

The spatial carrier $k\alpha$ has really become an electrical carrier $k\alpha v$ when scanned by the storage camera 67 with a velocity $v$. The resultant electrical signal on a carrier is envelope detected by an envelope detector 75, providing a signal $$e \text{ envelope} = [1 + \cos k\beta(z_1^1 - z_2^1)]^{1/2}$$
$$= (1 + \cos k\beta\Delta z^1)$$

where $\Delta z^1$ is the surface height information for the object with respect to the standard surface. Alternatively $I_1$ and $I_2$ signals can be applied to a product detector to develop a signal $$I_1 \times I_2 = a^2[1 + \frac{1}{2}\cos k\beta\Delta z^1]$$

This signal is displayed on a suitable display 76, which may be a cathode ray tube or other display of types well known in the art. It can be seen that the sensitivity of this system is readily controlled by $\beta$, which is the difference of the cosines of the angles of plane waves 65 and 66. This parameter can be controlled between 0 and 1 and can thus control the sensitivity of the contouring system in terms of fringes per unit of height difference between the object and standard surface.

This method of creating the interference pattern on the object itself can also be used with the image dissector arrangements shown in FIGS. 1 and 2. In this case a frequency shifter would be used in the same manner as the frequency shifter 19 in FIG. 1. The entire camera and subsequent processing of FIG. 7 can be replaced by that of FIGS. 1 and 2. Here again, the advantage of this latter method would be the control of the sensitivity of the resultant fringe pattern to elevation or height contour. The use of the relatively light insensitive image dissector compared to the storage camera tube would, however, necessitate the use of significantly more powerful light sources.

While particular embodiments of the invention have been shown and described, it will of course be understood that the invention is not limited thereto since many modifications in the circuits, optical arrangements, and in the instrumentalities employed may be made.

It is also apparent that a variety of standard reference surfaces can be used in addition to a plane surface. Thus, a smooth curved surface or a surface with some standard configuration could be used for the reference surface. Thus, in addition to contour mapping the present invention is also applicable for comparing an object surface with a standard reference surface of one form or another to determine the extent of deviation of the object surface from the standard surface. In this respect the invention is also applicable for monitoring object surface configurations with respect to standard surface configurations for quality control.

What is claimed is:

1. Apparatus for measuring small dimension surface height contours of an object by real time hologram interferometry comprising:

means for illuminating a standard reference surface to form a first scattered and reflected object beam and for illuminating the object whose surface height contours are to be measured to form a second scattered and reflected object beam;

means for generating from said illuminating means, a reference light beam;

a television camera tube for receiving a visual input and providing an electrical output;

means for combining said first object beam scattered and reflected from the standard surface with said reference light beam to form a first interference pattern which is received by said television camera tube as a visual input and for combining said second object beam scattered and reflected from the object surface with said reference light beam to form a second interference pattern said combining means positioned for projecting the first and second interference patterns at the visual input of said television camera tube for generating first and second electrical output corresponding to the first and second interference patterns respectively;

means for storing the first electrical output of said television camera tube corresponding to said first interference pattern;

and means for combining the second electrical output of said television camera tube corresponding to said second interference pattern with the stored electrical output of said television camera tube corresponding to said first interference pattern to form a signal containing surface position height information about the object surface relative to the standard surface.

2. Apparatus as described in claim 1 including restricting means for restricting the spatial frequency spectra of said first and second interference patterns to that of the television camera tube.

3. Apparatus as described in claim 2 in which said restricting means comprises a light frequency shifter inserted in the path of said reference light beam to provide a cyclical temporal offset of said reference light beam.

4. Apparatus as described in claim 1 comprising angular offset of said reference light beam with respect to the axis of said scattered and reflected object beam to allow the use of storage camera tubes.

5. Apparatus as described in claim 3 including a filter for removing unwanted components from the first and second electrical outputs of said television camera tube to form first and second filtered electrical outputs.

6. Apparatus as described in claim 3 in which said means for utilizing said signal containing position height information comprises a limiter for removing first pattern information.

7. Apparatus as described in claim 5 including envelope detecting means for envelope detecting said signal containing position deformation information.

8. Apparatus as described in claim 5 including a cathode ray tube for displaying the output of said envelope detecting means.

9. Apparatus as described in claim 5 including means for separating said first and second filtered electrical outputs into real and imaginary parts.

10. Apparatus ad described in claim 5 including means for synchronizing the second electrical output of said television camera tube to the stored first electrical output of said television camera tube.

11. Apparatus as described in claim 9 including means for combining the real and imaginary parts of said first and second filtered electrical outputs to form said signal containing position information.

12. Apparatus as set forth in claim 1 wherein said standard reference surface is a plane surface.

13. Apparatus as set forth in claim 1 wherein said standard reference surface comprises a smooth regular surface.

14. Apparatus for measuring small dimension height variations in an object surface by real time hologram interferometry comprising:
  means for illuminating a standard reference surface to form a first scattered and reflected object beam and for illuminating the object surface whose heights of variations are to be measured to form a second scattered and reflected object beam;
  means for generating from said illuminating means a reference light beam;
  a storage television camera tube for receiving a visual input and for converting the visual input information to an electrical output;
  means for combining said first object beam scattered and reflected from the standard surface with said reference light beam to form a first interference pattern which is received by said tube and for combining said second object beam scattered and reflected from the object surface with said reference light beam to form a second interference pattern which is received by said tube, said reference light beam disposed at an angle with respect to said first and second scattered and reflected object beams in order to eliminate undesired patterns by making their spatial frequencies beyond the capabilities of said storage television camera tube, said storage television camera tube providing temporary storage for superimposing the first and second interference pattersn at the visual input of the storage television camera tube;
  means for scanning said storage television camera tube to produce an electrical output signal; and
  inspecting means for inspecting said output signal to derive surface position height information about the object surface relative to the standard surface.

15. Apparatus as described in claim 14 in which said inspecting means comprises a cathode ray tube adapted to be viewed by an operator.

16. Apparatus as set forth in claim 14 wherein said standard surface is a plane surface.

17. Apparatus for generating small dimension height contours for an object surface by real time hologram interferometry comprising:
  means for illuminating a standard reference plane surface to form a first scattered and reflected object beam and for illuminating the object surface whose height contours are to be generated to form a second scattered and reflected object beam;
  means for generating from said illuminating means a reference light beam;
  a storage television camera tube for receiving a visual input and converting the visual input information to an electrical output;
  means for combining said first object beam scattered and reflected from the standard plane with said reference light beam to form a first interference pattern and for combining said second object beam scattered and reflected from the object surface with said reference light beam to form a second interference pattern, said reference light beam disposed at an angle with respect to said first and second scattered and reflected object beams in order to separate the interference information from that of the image said combining means positioned for projecting said first and second interference patterns at the visual input of said storage television camera tube;
  means for storing a first electrical output from the storage television camera tube corresponding to the first interference pattern projected at at storage television camera tube input;
  and means for combining a second electrical output from the storage television camera tube corresponding to the second interference pattern projected ac the storage television camera tube input to form a signal containing object surface contour information.

18. Apparatus as described in claim 17 in which said means for combining said first and said second electrical outputs comprises a subtracter having an output.

19. Apparatus as described in claim 18 including an envelope detector for detecting said envelope of said subtracter to form said signal containing position deformation information.

20. Apparatus as described in claim 1 in which said television camera tube is a storage tube and in which said means for combining the second electrical output of said television camera tube corresponding to said second interference pattern with the stored first electrical output of said television camera tube corresponding to said first interference pattern comprises a subtracter which produces said signal containing position information only when there is position deformation in the object between said first and said second interference pattern.

21. Apparatus for measuring small dimensional changes in an object by real time hologram interferometry comprising:
a television camera tube spaced from the object along an optical axis, said camera tube adapted for receiving a visual input and generating an electrical output;
means for illuminating a standard reference surface with first and second plane waves incident on the standard surface at angles $\theta_1$ and $\theta_2$ respectively, said angles measured with respect to said optical axis of said television camera tube, whereby said first and second plane waves form a first interference pattern on the standard surface, and for illuminating the object with first and second plane waves incident on the object at angles $\theta_1$ and $\theta_2$ respectively said angles measured with respect to the optical axis of said television camera tube whereby said first and second plane waves form a second interference pattern on said object;
means for imaging the first and second interference patterns on the visual input of said television camera tube to form first and second electrical outputs;
storage means for storing said first electrical output;
combining means for combining said second electrical output with said first electrical output from said storage means to form a combined output;
and detecting means for detecting said combined output to form a detected output.

22. Apparatus according to claim 21 where said television camera is a storage television camera.

23. Apparatus according to claim 21 in which said combining means comprises a subtracter for subtracting said second electrical output from said first electrical output.

24. Apparatus according to claim 21 including a light frequency shifter situated in the path of said second plane wave to provide a cyclical temporal offset of said reference light beam.

25. Apparatus as described in claim 24 including a filter for removing unwanted components from the first and second electrical outputs of said television camera to form first and second filtered electrical outputs.

26. Apparatus as described in claim 25 including envelope detecting means for envelope detecting said signal containing position deformation information.

27. Apparatus as set forth in claim 21 wherein said standard surface comprises a plane surface.

28. Apparatus as set forth in claim 21 wherein said standard surface comprises a smooth regular surface.

29. A method for measuring small dimension surface height contours on an object by real time hologram interferometry comprising:
illuminating a standard reference surface to form a first scattered and reflected object beam;
generating a reference light beam;
combining said first object beam scattered and reflected from the standard surface with said reference light beam to form a first interference pattern and projecting said first interference pattern on a television camera tube as a visual input;
storing the first electrical output of said television camera tube corresponding to said first interference pattern;
illuminating the object whose surface contours are to be measured to form a second scattered and reflected object beam;
combining said second scattered and reflected object beam with said reference light beam to form a second interference pattern and projecting the second interference pattern on said television camera tube as a visual input;
and combining the second electrical output of the television camera tube corresponding to the second interference pattern with the stored electrical output of the television camera tube corresponding to the first interference pattern to form a signal containing surface position height information about the object surface relative to the standard surface.

30. The method as described in claim 29 including the step of restricting the spatial frequency spectra of said first and second interference patterns to that of the television camera tube.

31. The method as described in claim 30 in which said step of restricting comprises cyclically temporally offsetting said reference light beam.

32. The method as described in claim 29 comprising the step of angularly offsetting said reference light beam with respect to the axis of said scattered and reflected object beams to allow the use of storage camera tubes.

33. A method as described in claim 31 including the step of filtering unwanted components from the first and second electrical outputs of said television camera tube to form first and second filtered electrical outputs.

34. The method as described in claim 29 including the step of envelope detecting said signal containing position height information.

35. The method as described in claim 34 including the step of displaying the result of said envelope detecting.

36. The method as described in claim 33 including the step of separating said first and second filtered electrical outputs into real and imaginary parts.

37. The method as described in claim 33 including the step of synchronizing the second electrical output of said television camera tube to the stored first electrical output of said television camera tube.

38. The method described in claim 36 including the step of combining the real and imaginary parts of said first and second filtered electrical outputs to form said signal containing position information.

39. A method for measuring small dimension height variations in an object surface by real time hologram interferometry comprising:
illuminating a standard reference surface to form a first scattered and reflected object beam;
generating a reference light beam;
combining said first object beam scattered and reflected from the standard surface with said reference light beam to form a first interference pattern disposing said reference light beam at an angle with respect to said first scattered and reflected first object beam in order to offset the spatial frequencies of undesired patterns, and projecting said first interference pattern as the visual input to a storage television camera tube;
illuminating the object whose surface height variations are to be measured to form a second scattered and reflected object beam;

combining said second scattered and reflected object beam with said reference light beam to form a second interference pattern, disposing said reference light beam at an angle with respect to said second scattered and reflected object beam in order to offset the spatial frequency of undesired patterns, and projecting said second interference pattern as a visual input to a storage television camera tube;

scanning said storage television camera tube to produce an output signal;

and inspecting said output signal to derive surface position height information about the object surface relative to the standard surface.

40. A method for measuring small dimensional surface variations in an object by real time hologram interferometry comprising:

a television camera tube spaced from the object and having an optical axis, said camera having a visual input and and electrical output;

illuminating a standard reference surface with first and second plane waves incident on the standard surface at angles $\theta_1$ and $\theta_2$ respectively with respect to the optical axis of a television camera tube, whereby said first and second plane waves form a first interference pattern;

imaging said first interference pattern at the visual input of the television camera tube to form a first electrical output;

storing said first electrical output;

illuminating the object whose surface variations are to be measured with first and second plane waves incident on the object at angles $\theta_1$ and $\theta_2$, respectively, with respect to said optical axis of said television camera tube, whereby said first and second plane waves form a second interference pattern on said object;

imaging said second interference pattern on said visual input of said television camera tube to form a second electrical output;

combining said second electrical output with said first electrical output from said storage means to form a combined output;

and detecting said combined output to form a detected output.

41. A method according to claim 40 including the step of cyclically temporally offsetting said reference light beam.

42. A method as described in claim 41 including the step of filtering unwanted components from the first and second electrical outputs of said television camera to form first and second filtered electrical outputs.

43. A method as described in claim 42 including the step of envelope detecting said combined signal.

* * * * *